United States Patent [19]

Hwang et al.

[11] Patent Number: 5,326,836
[45] Date of Patent: Jul. 5, 1994

[54] PROCESS FOR THE PREPARATION OF A FLAME RETARDANT STYRENIC RESIN

[75] Inventors: Yong Y. Hwang; Bong H. Park, both of Daejeon, Rep. of Korea

[73] Assignee: Lucky Limited, Seoul, Rep. of Korea

[21] Appl. No.: 938,867

[22] Filed: Sep. 2, 1992

[30] Foreign Application Priority Data

Sep. 3, 1991 [KR] Rep. of Korea .................. 91-15366

[51] Int. Cl.$^5$ .................. C08F 4/34; C08F 212/08
[52] U.S. Cl. .................. 526/79; 526/87; 526/224; 526/232.1; 526/293; 526/342; 526/347
[58] Field of Search .............. 526/79, 87, 342, 347, 526/224, 232.1, 293

[56] References Cited

U.S. PATENT DOCUMENTS 4,659,790  4/1987  Shimozato et al. .................. 526/79
5,032,650  7/1991  Yamamoto et al. .................. 526/79

Primary Examiner—Joseph L. Schofer
Assistant Examiner—Tom Weber
Attorney, Agent, or Firm—James D. Hall

[57] ABSTRACT

The present invention provides a process for preparing a flame retardant styrenic resin which comprises:

(1) an initiation step wherein 3 to 10 parts by weight of a bromostyrene compound, 10 to 25 parts by weight of styrene, 5 to 10 parts by weight of an unsaturated nitrile, 0.01 to 0.5 part by weight of a chain transfer agent and 0.01 to 1.0 part by weight of an initiator are introduced to a polymerization reactor and polymerized until the conversion reaches 30 to 50%;

(2) a control step wherein 10 to 35 parts by weight of a bromostyrene compound, 20 to 50 parts by weight of styrene, 5 to 20 parts by weight of an unsaturated nitrile, 0.01 to 1.0 part by weight of an initiator and 0.01 to 0.5 part by weight of a chain transfer agent are introduced to the reactor in one or more divisions in accordance with the progress of said polymerization until the conversion reaches 80 to 90%; and (3) an optimization step wherein 3 to 10 parts by weight of styrene, 5 parts by weight or less of an unsaturated nitrile, 0.01 to 0.3 part by weight of a chain transfer agent and 0.01 to 0.5 part by weight of an initiator are introduced to the reactor until the polymerization is completed.

5 Claims, No Drawings

PROCESS FOR THE PREPARATION OF A FLAME RETARDANT STYRENIC RESIN

FIELD OF THE INVENTION

The present invention relates to a process for preparing a flame retardant styrenic resin; and, more specifically, a process for preparing a styrenic resin containing a bromostyrene compound of formula (I):

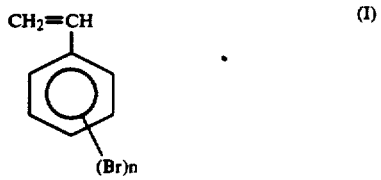

wherein, n is an integer from 1 to 5.

BACKGROUND OF THE INVENTION

Flame retardants have been widely employed in various industrial products such as electrical home appliances and electronic equipment. However, such use of flame retardants has been found to adversely affect such material characteristics as heat, weather or impact resistance or processing property of the matrix resin; and the added flame retardants are bloomed over a surface of a resin.

In an attempt to ameliorate the above problems, there has been suggested a process which comprises bonding chemically a reactive flame retardant, e.g., bromostyrene compound, to a polymer backbone.

For instance, a flame retardant acrylonitrile butadiene styrene(ABS) resin can be prepared by either copolymerizing a bromostyrene compound, an aromatic vinyl hydrocarbon and an unsaturated nitrile with a butadiene rubber emulsifier during the preparation of a conventional ABS resin or blending a terpolymer of bromostyrene, aromatic vinyl hydrocarbon and unsaturated nitrile with a conventional ABS resin.

However, the former process still shows disadvantages: it tends to raise the glass transition temperature as well as entail a low production rate and further requires complicated procedures due to an increase in its coagulation temperature.

In the case of the latter process, it often deteriorates the compatibility of the terpolymer with the styrene acrylonitrile (SAN) resin constituting the matrix for the ABS resin, which in turn adversely affects the mechanical properties of the end product. Accordingly, in order to maintain the compatibility, the content of the bromostyrene compound should be lowered and the terpolymer should be of homogeneous random copolymer.

However, lowering the content of the bromostyrene compound may fail to produce the desired flame retardance; and also a homogeneous random copolymer cannot be produced by using a conventional suspension polymerization method due to a large difference in reactivity between the bromostyrene compound and two other monomers, i.e., aromatic vinyl hydrocarbon and unsaturated nitrile.

Consequently, needs have continued to exist for the development of a process for the preparation of a flame retardant styrenic resin capable of eliminating the above deficiencies.

SUMMARY OF THE INVENTION

Accordingly, it is an object of the present invention to provide a suspension polymerization process for preparing a terpolymer of bromostyrene, styrene and unsaturated nitrile having good compatibility with the SAN resin and good flame retardance by way of; carrying out the polymerization in several steps and controlling the concentration of each monomer in such manner to produce a homogeneous terpolymer having a high content of bromostyrene.

Another object of the invention is to provide a process for preparing an improved flame retardant ABS resin without impairing the physical properties thereof by way of incorporating the terpolymer obtained in accordance with the present polymerization process into a conventional ABS resin.

DETAILED DESCRIPTION OF THE INVENTION

In accordance with one aspect of the invention, there is provided a process for preparing a flame retardant styrenic resin which comprises:

(1) an initiation step wherein 3 to 10 parts by weight of a bromostyrene compound, 10 to 25 parts by weight of styrene, 5 to 10 parts by weight of an unsaturated nitrile, 0.01 to 0.5 part by weight of a chain transfer agent and 0.01 to 1.0 part by weight of an initiator are introduced to a polymerization reactor and polymerized until the conversion reaches 30 to 50%;

(2) a control step wherein 10 to 35 parts by weight of a bromostyrene compound, 20 to 50 parts by weight of styrene, 5 to 20 parts by weight of an unsaturated nitrile, 0.01 to 1.0 part by weight of an initiator and 0.01 to 0.5 part by weight of a chain transfer agent are introduced to the reactor in one or more divisions in accordance with the progress of said polymerization, e.g. in the following three steps: (a) 2.5 to 12.25 parts by weight of a bromostyrene compound, 5 to 17.5 parts by weight of styrene, 1.25 to 7 parts by weight of an unsaturated nitrile, 0.0025 to 0.35 part by weight of an initiator and 0.0025 to 0.175 part by weight of a chain transfer agent are introduced to the reactor and polymerized until the conversion reaches 40 to 60%; (b) 3 to 26.25 parts by weight of a bromostyrene compound, 6 to 37.5 parts by weight of styrene, 1.5 to 15 parts by weight of an unsaturated nitrile, 0.003 to 0.75 part by weight of an initiator and 0.003 to 0.375 part by weight of a chain transfer agent are introduced to the reactor and polymerized until the conversion reaches 60 to 75%; (c) 0 to 4.5 parts by weight of a bromostyrene compound, 0 to 9 parts by weight of styrene, 0 to 2.25 parts by weight of an unsaturated nitrile, 0 to 0.0045 part by weight of an initiator and 0 to 0.0045 part by weight of a chain transfer agent are introduced to the reactor and polymerized until the conversion reaches 80 to 90%; and (3) an optimization step wherein 3 to 10 parts by weight of styrene, 5 parts by weight or less of an unsaturated nitrile, 0.01 to 0.3 part by weight of a chain transfer agent and 0.01 to 0.5 part by weight of an initiator are introduced to the reactor until the polymerization is completed.

The term "conversion" as used herein is defined as the percentage ratio between the total amount of the monomers fed to the reactor and the polymer formed therefrom; and calculated in accordance with the following equation:

Conversion(%) =

$$\frac{\text{Amount of polymer produced(g)}}{\text{Total amount of monomers introduced(g)}} \times 100$$

The present suspension polymerization is carried out in the above three steps to produce a homogeneous terpolymer having a high content of bromostyrene compound by controlling the concentration of each monomer. Specifically, the first initiation step is contucted to obtain a randomly arranged terpolymer of styrene, unsaturated nitrile and bromostyrene and to maintain the stability of the polymer latex by way of introducing a small amount of bromostyrene compound and thereby preventing the occurrence of a vigorous reaction as would be expected in case a large amount of bromostyrene compound is present; the second control step is carried out to obtain a homogeneous random terpolymer by way of introducing the monomers in proportionate amounts in a number of steps, e.g., three, depending on the progress of the reaction, while maintaining the stability of the latex; and the final optimization step is performed to use up the residual bromostyrene compound by way of introducing a small amount of styrene and an unsaturated nitrile.

The present polymerization may be carried out under the conventional condition, except that the above technical features.

Another aspect of the present invention resides in a process for preparing an ABS resin with improved flame retardance without impairing the physical properties thereof which comprises incorporating the terpolymer of bromostyrene, styrene and unsaturated nitrile obtained by the polymerization process of the present invention into a conventional ABS resin.

The bromostyrene compound used in the present invention may be represented by the following formula (I):

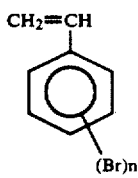

wherein, n is an integer from 1 to 5.

The content of the bromostyrene compound in the terpolymer is preferably in the range of 15 to 60% by weight.

Representative unsaturated nitriles useful in the present invention include: acrylonitrile, methacrylonitrile, ethacrylonitrile, α-chloroacrylonitrile, α-fluoroacrylonitrile, etc.

The initiators suitable for use in the present invention are: peroxide and diazo compounds which are soluble in the monomers, e.g., benzoyl peroxide, lauryl peroxide, oleyl peroxide, t-butyl peracetate, t-butyl perbenzoate, dicumyl peroxide, t-butylperoxide, azobisisobutyronitrile, etc.

Exemplary chain transfer agents suitable for use in the present invention are: alkyl mercaptan such as n-dodecyl mercaptan and t-dodecyl mercaptan.

In addition to the above components, conventional suspension stabilizers including polyvinyl alcohol wherein the vinyl acetate content is 14 to 35 mole %, polyacrylic acid wherein 2-ethylhexyl acrylate content is 2 to 12 mole %, hydroxy ethylcellulose, etc. may be employed for the polymerization process of the present invention.

20 to 60 parts by weight of the terpolymer prepared in accordance with the present invention may be blended employing a conventional method known in the art, with 35 to 50 parts by weight of a conventional ABS resin and up to 30 parts by weight of a conventional SAN resin so as to improve the flame retardance.

The following examples are given to further illustrate the invention and should not be construed as limiting its scope. In the following examples, all parts and percentages are given in terms of weight unless otherwise specified.

EXAMPLE 1

100 parts of deionized water and 0.3 part of polyvinyl alcohol wherein the vinylacetate content is 28 mole % and the viscosity of 4% aqueous solution thereof is 34 cp at 25° C., as a suspension stabilizer, were introduced to a polymerization reactor followed by raising the inner temperature of the reactor to 80° C. Thereafter, 8 parts of tribromostyrene, 13 parts of styrene, 5 parts of acrylonitrile, 0.08 part of benzoyl peroxide, 0.03 part of dicumyl peroxide and 0.07 part of t-dodecyl mercaptan were introduced to the reactor and subjected to a first polymerization.

When the conversion of the first polymerization reached 38%, 9.6 parts of tribromostyrene, 7.5 parts of styrene, 3.3 part of acrylonitrile, 0.03 part of benzoyl peroxide, 0.015 part of dicumyl peroxide and 0.042 part of t-dodecyl mercaptan were introduced to the reactor; and, thereafter, when the conversion reached 52%, 22.4 parts of tribromostyrene, 17.5 parts of styrene, 7.7 parts of acrylonitrile, 0.07 part of benzoyl peroxide, 0.035 part of dicumyl peroxide and 0.098 part of t-dodecyl mercaptan were introduced and subjected to a second polymerization while gradually increasing the polymerization temperature to 120° C.

When the conversion of the second polymerization reached 85%, 4.5 parts of styrene, 1.0 part of acrylonitrile, 0.3 part of benzoyl peroxide and 0.02 part of t-dodecyl mercaptan were introduced and subjected to a third polymerization while increasing the polymerization temperature to 134° C. to complete the polymerization. The unreacted and residual styrene and acrylonitrile monomers were stripped and filtered for their removal; and the final product was dried to obtain the polymer beads.

50 parts of the polymer so obtained, 45 parts of a conventional ABS resin(A) consisting of 50% of butadiene rubber, 37% of styrene and 13% of acrylonitrile, 5 parts of a conventional SAN resin(B) consisting of 75% of styrene and 25% of acrylonitrile, 7 parts of diantimony trioxide, 1.0 part of potassium stearate and 1.0 part of diphenyl isooctyl phosphite were blended through an extruder. The test specimens were prepared by injection molding the extruded pellets. The results of the tests are shown in Table 1.

EXAMPLE 2

As in Example 1, 10 parts of dibromostyrene, 13.5 parts of styrene, 5.5 parts of acrylonitrile, 0.1 part of benzoyl peroxide, 0.04 part of dicumyl peroxide and 0.08 part of t-dodecyl mercaptan were introduced to the reactor and subjected to a first polymerization.

For a second polymerization, 30 parts of dibromostyrene, 25 parts of styrene, 11.5 parts of acrylonitrile, 0.16 part of benzoyl peroxide, 0.05 part of dicumyl peroxide and 0.18 part of t-dodecyl mercaptan were divided into three equal portions and separately introduced to the reactor whenever the conversion reached 43%, 55% and 72%.

When the conversion of the second polymerization reached 85%, 4.0 parts of styrene, 0.5 part of acrylonitrile and 0.3 part of dicumyl peroxide were introduced to the reactor and subjected to a third polymerization. The unreacted and residual styrene and acrylonitrile monomers were stripped and filtered for their removal; and the final product was dried to obtain the polymer beads.

50 parts of the polymer so obtained, 50 parts of a conventional ABS resin(A) used in Example 1, 7 parts of diantimony trioxide, 1.0 part of potassium stearate and 1.0 part of diphenyl isooctyl phosphite were blended through an extruder. The test specimens were prepared by injection molding the extruded pellets. The results are shown in Table 1.

EXAMPLE 3

As in Example 1, 5 parts of tribromostyrene, 13.6 parts of styrene, 4.9 parts of acrylonitrile, 0.08 part of benzoyl peroxide, 0.03 part of dicumyl peroxide and 0.07 part of t-dodecyl mercaptan were introduced to the reactor and subjected to a first polymerization.

For a second polymerization, 25 parts of tribromostyrene, 24 parts of styrene, 13.5 parts of acrylonitrile, 0.25 part of benzoyl peroxide, 0.05 part of dicumyl peroxide and 0.12 part of t-dodecyl mercaptan were divided into three equal portions and separately introduced to the reactor whenever the conversion reached 41%, 55% and 73%.

When the conversion of the second polymerization reached 84%, 5 parts of styrene and 0.5 part of benzoyl peroxide were introduced to the reactor and subjected to a third polymerization.

50 parts of the polymer so obtained, 50 parts of a conventional ABS resin(A) employed in Example 1, 1.0 part of diantimony trioxide, 1.0 part of potassium stearate and 1.0 part of diphenyl isooctyl phosphite were blended through an extruder. The test specimens were prepared by injection molding the extruded pellets. The results are shown in Table 1.

EXAMPLE 4

As in Example 1, 15 parts of dibromostyrene, 11 parts of styrene, 5.2 parts of acrylonitrile, 0.1 part of benzoyl peroxide, 0.03 part of dicumyl peroxide and 0.08 part of t-dodecyl mercaptan were introduced to the reactor and subjected to a first polymerization.

For a second polymerization, 35 parts of dibromostyrene, 19 parts of styrene, 10.8 parts of acrylonitrile, 0.23 part of benzoyl peroxide, 0.1 part of dicumyl peroxide and 0.15 part of t-dodecyl mercaptan were divided into three equal portions and separately introduced to the reactor whenever the conversion reached 35%, 50% and 65%.

When the conversion of the second polymerization reached 80%, 4.0 parts of styrene and 0.5 part of benzoyl peroxide were introduced to the reactor and subjected to a third polymerization.

50 parts of the polymer so obtained, 50 parts of a conventional ABS resin(A) employed in Example 1, 6.0 parts of diantimony trioxide, 1.0 part of potassium stearate and 1.0 part of diphenyl isooctyl phosphite were blended through an extruder. The test specimen were prepared by injection molding the extruded pellets. The results are shown in Table 1.

COMPARATIVE EXAMPLE 1

100 parts of deionized water and 0.3 part of polyvinyl alcohol wherein the vinylacetate content is 28 mole % and the viscosity of 4% aqueous solution thereof is 34 cp at 25° C. were introduced to a polymerization reactor followed by raising the inner temperature of the reactor to 80° C. Thereafter, 40 parts of tribromostyrene, 43 parts of styrene, 17 parts of acrylonitrile, 0.35 part of benzoyl peroxide, 0.1 part of dicumyl peroxide and 0.3 part of t-dodecyl mercaptan were introduced to the reactor and subjected to a polymerization. When the conversion reached 80%, the polymerization temperature was continuously increased to 135° C. to further carry out the polymerization. After the polymerization was completed, the unreacted and residual styrene and acrylonitrile monomers were stripped and filtered for their removal; and the final product was dried to obtain the polymer beads.

50 parts of the polymer so obtained, 50 parts of a conventional ABS resin(A) employed in Example 1, 7 parts of diantimony trioxide, 1.0 part of potassium stearate and 1.0 part of diphenyl isooctyl phosphite were blended through an extruder to obtain a specimen for measuring physical properties. The results are shown in Table 1.

COMPARATIVE EXAMPLE 2

50 parts of a conventional ABS resin(A) employed in Example 1, 30 parts of SAN resin(B) employed in Example 1, 20 parts of 1,2-bis-(2,4,6-tribromophenoxy)ethane, 8 parts of diantimony trioxide, 1.0 part of potassium stearate and 1.0 part of diphenyl isooctyl phosphite were blended through an extruder to obtain a specimen for measuring the physical properties. The results are shown in Table 1.

COMPARATIVE EXAMPLE 3

The same procedure as in Comparative Example 2 was repeated except that 1,2-bis-(2,4,6-tribromophenoxy)ethane was changed to an equivalent amount of octabromodiphenyl oxide. The results are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Remained Bromostyrene Monomer (ppm) | 4400 | 3600 | 3800 | 4000 | 15300 | | |
| Impact Strength (Kg cm/cm)[1] | 15.4 | 15.8 | 16.3 | 15.6 | 8.2 | 15.0 | 9.2 |
| Heat Deflection Temperature (°C.)[2] | 91.3 | 90.6 | 89.8 | 90.4 | 90.6 | 72.2 | 84.6 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| U.V. Stability ($\Delta E$)[3] | 3.5 | 3.4 | 3.0 | 3.8 | 4.4 | 3.5 | 21.3 |
| Flame Retardance[4] | V-O | V-O | V-O | V-O | V-O | V-O | V-O |
| Blooming[5] | O | O | O | O | O | X | O |

[1]It was determined under ASTM D 256.
[2]It was determined under ASTM D 648.
[3]After irradiation for 300 hours in Fade-O-Meter, the degree of discoloring was measured by using Atlas Ci 35A under ASTM D-4459.
[4]It was determined under UL-94.
[5]After a dark specimen was left in an oven at 70° C. for one month, it was visually determined.
O: No blooming appeared.
X: Blooming appeared.

As can be seen from Table 1, the present flame retardant styrenic resin prepared in Examples 1 to 4 can exhibit excellent flame retardance without impairing any of its important physical characteristics.

While the invention has been described with respect to the above specific embodiments, it should be recognized that various modifications and changes as may be apparent to those skilled in the art to which the invention pertains may be made and also fall within the scope of the invention as defined by the claims that follow.

What is claimed is:

1. A process for preparing a flame retardant styrenic resin which comprises:
   (1) an initiation step wherein 3 to 10 parts by weight of a bromostyrene compound of formula(I), 10 to 25 parts by weight of styrene, 5 to 10 parts by weight of an unsaturated nitrile, 0.01 to 0.5 part by weight of a chain transfer agent and 0.01 to 1.0 part by weight of an initiator are introduced to a polymerization reactor and polymerized until the conversion reaches 30 to 50%;
   (2) a control step wherein 10 to 35 parts by weight of a bromostyrene compound, 20 to 50 parts by weight of styrene, 5 to 20 parts by weight of an unsaturated nitrile, 0.01 to 1.0 part by weight of an initiator and 0.01 to 0.5 part by weight of a chain transfer agent are introduced to the reactor in one or more divisions in accordance with the progress of said polymerization until the conversion reaches 80 to 90%; and
   (3) an optimization step wherein 3 to 10 parts by weight of styrene, 5 parts by weight or less of an unsaturated nitrile, 0.01 to 0.3 part by weight of a chain transfer agent and 0.01 to 0.5 part by weight of an initiator are introduced to the reactor until the polymerization is completed:

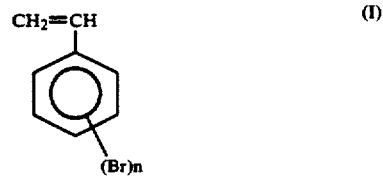

wherein, n is an integer from 1 to 5.

2. The process of claim 1 wherein the unsaturated nitrile is acrylonitrile, methacrylonitrile, ethacrylonitrile, α-chloroacrylonitrile or α-fluoroacrylonitrile.

3. The process of claim 1 wherein the chain transfer agent is benzoyl peroxide, lauryl peroxide, oleyl peroxide, t-butyl peracetate, t-butyl perbenzoate, dicumyl peroxide, t-butyl peroxide or azobisisobutyronitrile.

4. The process of claim 1 wherein the initiator is n-dodecyl mercaptan or t-dodecyl mercaptan.

5. A process for preparing a flame retardant ABS resin which comprises incorporating the terpolymer obtained by the process of claim 1 into an ABS resin.

* * * * *